(12) United States Patent
Cook et al.

(10) Patent No.: US 8,536,503 B2
(45) Date of Patent: Sep. 17, 2013

(54) FACETED RETRO-MIRROR FOR LINE-OF-SIGHT JITTER SENSING

(75) Inventors: Lacy G. Cook, El Segundo, CA (US); Philip T. Shimon, Torrance, CA (US)

(73) Assignee: Raytheon Company, Waltham, MA (US)

( * ) Notice: Subject to any disclaimer, the term of this patent is extended or adjusted under 35 U.S.C. 154(b) by 206 days.

(21) Appl. No.: 13/286,362

(22) Filed: Nov. 1, 2011

(65) Prior Publication Data
US 2013/0105671 A1    May 2, 2013

(51) Int. Cl.
*H01J 3/14* (2006.01)

(52) U.S. Cl.
USPC .............. 250/201.1; 250/203.1; 250/216; 244/3.16; 348/208.4

(58) Field of Classification Search
USPC .............. 250/201.1, 203.1, 206.2, 234, 216; 244/3.11, 3.15, 3.16; 348/208.4, 208.5, 208.11; 356/139.08, 152.2, 152.3
See application file for complete search history.

(56) References Cited

U.S. PATENT DOCUMENTS

| | | | |
|---|---|---|---|
| 4,010,365 A | | 3/1977 | Meyers et al. |
| 4,445,140 A | * | 4/1984 | Netzer ........................ 348/208.5 |
| 4,701,602 A | * | 10/1987 | Schaefer et al. ......... 356/139.08 |
| 6,700,109 B2 | * | 3/2004 | Eckelkamp-Baker et al. ........................ 250/203.1 |
| 2002/0145102 A1 | | 10/2002 | Eckelkamp-Baker et al. |
| 2004/0183917 A1 | | 9/2004 | von Flotow et al. |

* cited by examiner

*Primary Examiner* — Kevin Pyo
(74) *Attorney, Agent, or Firm* — Lando & Anastasi, LLP (57) ABSTRACT

A jitter sensing mechanism for a gimbaled optical sensor system. In one example, the jitter sensing mechanism includes a faceted retro-mirror configured to allow a double-pass line-of-sight monitoring beam to sense line-of-sight jitter in a multi-axis gimbaled optical sensor system where the inner-most gimbal axis includes a 2:1 gain mirror.

19 Claims, 8 Drawing Sheets

FACETED RETRO-MIRROR FOR LINE-OF-SIGHT JITTER SENSING

BACKGROUND

Gimbaled optical sensors that are mounted on mobile platforms, for example, airborne sensors, benefit from line-of-sight jitter sensing and control. In particular, tracking or targeting sensors may require precise, continuous line-of-sight jitter sensing and control. Generally, jitter sensing is accomplished using either a single-pass or double-pass jitter sensing optical beam which is sensed at high bandwidth and used to control a jitter-correcting beam-steering mirror.

SUMMARY OF INVENTION

Aspects and embodiments are directed to a jitter sensing mechanism and method in a gimbaled optical sensor system. As discussed further below, according to one embodiment, a faceted retro-mirror is used to allow a double-pass line-of-sight monitoring beam to sense line-of-sight jitter in a multi-axis gimbaled optical sensor system where one axis includes a 2:1 gain mirror.

According to one embodiment, a gimbaled optical sensor system comprises a multi-axis gimbal, a jitter sensing beam source configured to generate a jitter sensing beam that travels along a line of sight of the gimbaled optical sensor system, a jitter sensing beam detector, a 2:1 gain flat mirror mounted on an inner-most gimbal axis and configured to reflect the jitter sensing beam, and a faceted retro-mirror rigidly mounted on a second gimbal axis, positioned out of plane with the 2:1 gain flat mirror, and optically coupled to the 2:1 gain flat mirror, the faceted retro-mirror including a plurality of facets each tilted with respect to adjacent facets by an angular tilt, the faceted retro-mirror configured to reflect the jitter sensing beam to a field of view of the jitter sensing detector over a range of angular movement of the 2:1 gain flat mirror.

In one example, the angular tilt of the adjacent facets is approximately one degree in elevation. The jitter sensing beam detector may include, for example, a position centroid sensing photodetector or a pixilated imaging array. In one example, the inner-most gimbal axis is an elevation axis, and the second gimbal axis is an azimuth axis. In one example, the range of angular movement of the 2:1 gain flat mirror is approximately ±5 degrees. In another example, the range of angular movement of the 2:1 gain flat mirror is approximately ±10 degrees. In another example, each facet of the plurality of facets further includes an alternating azimuth tilt. In this example, the jitter sensing beam detector may include two photodetectors positioned side-by-side, wherein the alternating azimuth tilt of each facet is selected such that each facet reflects the jitter sensing beam to only one of the two photodetectors.

According to another embodiment, a multi-function gimbaled optical sensor system comprises a jitter sensing beam source configured to generate a jitter sensing beam, a jitter sensing detector, and an opto-mechanical assembly including a 2:1 gain flat mirror mounted on an elevation axis of the opto-mechanical assembly, and a faceted retro-mirror mounted on an azimuth axis of the opto-mechanical assembly and optically coupled to the 2:1 gain flat mirror, the opto-mechanical assembly being configured to actuate the 2:1 gain flat mirror over a range of angular movement. The faceted retro-mirror includes a plurality of facets each tilted with respect to adjacent facets by an angular tilt, the faceted retro-mirror being configured to reflect the jitter sensing beam to a field of view of the jitter sensing detector over the range of angular movement of the 2:1 gain flat mirror.

In one example, the angular tilt of the adjacent facets is approximately one degree in elevation. The jitter sensing detector may include, for example, a position centroid sensing photodetector or a pixilated imaging array. In one example, the range of angular movement of the 2:1 gain flat mirror is approximately ±5 degrees. In another example, the range of angular movement of the 2:1 gain flat mirror is approximately ±10 degrees. In another example, each facet of the plurality of facets further includes an alternating azimuth tilt. In this example, the jitter sensing beam detector may include two photodetectors positioned side-by-side, and wherein the alternating azimuth tilt of each facet is selected such that each facet reflects the jitter sensing beam to only one of the two photodetectors.

Another embodiment is directed to a method of line of sight jitter sensing in a gimbaled optical sensor system. In one embodiment, the method comprises generating a jitter sensing beam, directing the jitter sensing beam along a line of sight of the optical sensor system, reflecting the jitter sensing beam from a 2:1 gain flat mirror to a faceted retro-mirror disposed out of plane with the 2:1 gain flat mirror, actuating the 2:1 gain flat mirror over a range of angular motion, and returning the jitter sensing beam from at least one facet of the faceted retro-mirror via the 2:1 gain flat mirror to a jitter sensing detector over the range of angular motion of the 2:1 gain flat mirror. In one example, the range of angular movement of the 2:1 gain flat mirror is approximately ±5 degrees. In another example, the range of angular movement of the 2:1 gain flat mirror is approximately ±10 degrees.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Multi-function gimbaled airborne optical sensors may perform a range of functions, such as, for example, air-to-ground targeting or imaging, air-to-air tracking, and/or side-looking scanning. To achieve these functions, the system may include multiple passive and/or active sensors, such as infrared cameras, visible-light cameras, a laser transmitter, LIDAR sensors, etc. An opto-mechanical assembly, including a multi-axis gimbal and optics for beam steering and focusing, directs optical beams to and from the sensors and ensures all sensors are "boresighted" (pointing in the same direction). The opto-mechanical assembly also functions to stabilize the optical beams to and from the sensors since the aircraft (or other mobile platform) may be subject to disturbances, such as wind gusts or other environmental effects. The field of regard of the optical system as a whole may be large, for example, approximately a hemisphere or hyperhemisphere around a central line-of-sight axis, for example, along a direction of travel of the mobile platform. However, the field of view of each individual sensor may be relatively small, for example, approximately one degree(1°). Accordingly, the opto-mechanical assembly is used to accurately point the fields of view of the individual sensors within the field of regard of the overall system, and includes steering mirrors and gimbals to achieve this function. In this context, there is a need to stabilize optical functions over the large field of regard and provide optical measurements that can be used to generate error-correcting signals that can be applied to the beam-steering mirror(s).

Aspects and embodiments are directed to systems and methods that provide precise line-of-sight (LOS) jitter sensing and control over a wide field of regard. According to one embodiment, a faceted retro-mirror is used to allow a double-pass line-of-sight monitoring beam to sense line-of-sight jitter in a gimbaled optical sensor system, in particular, a system where the inner-most gimbal axis includes a 2:1 gain mirror, as discussed further below. In one example, the faceted retro-mirror has a plurality of facets that have a fixed tilt relative to one another, and is configured such that the facets compensate for angular movement of 2:1 gain mirror on the inner-most gimbal axis so as to periodically return the monitoring beam to the center of the field of view of the jitter-sensing detector, as discussed below. This mechanism allows for accurate line of sight jitter sensing in multi-function, multi-axis gimbaled optical sensor systems, where conventional jitter sensing may be limited.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
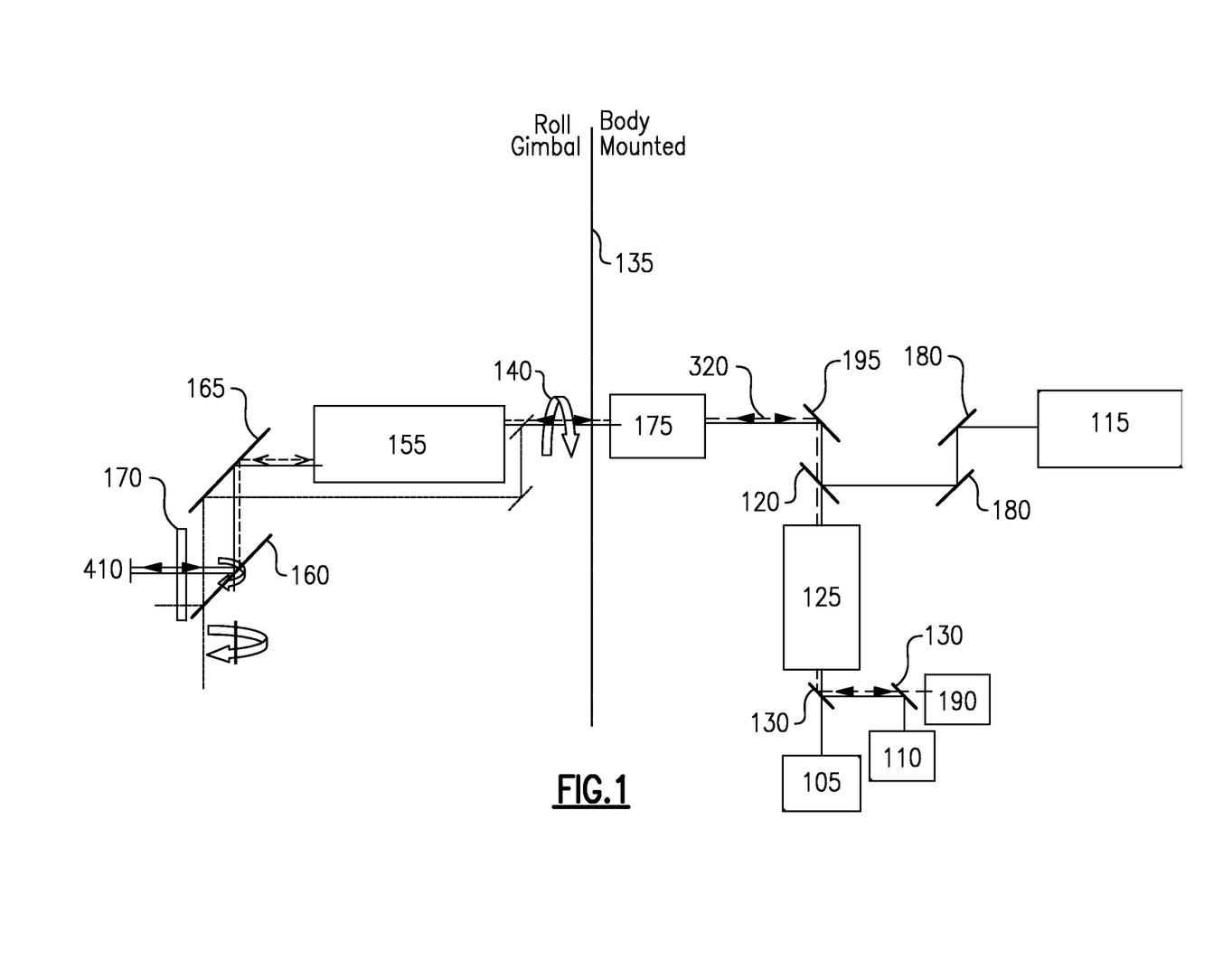
FIG. 1 is a block diagram of one example of a gimbaled optical sensor system showing an example of a path of a double-pass jitter-sensing beam through the optical sensor system, according to aspects of the invention.

Referring to FIG. 1 there is illustrated a block diagram of one example of a multi-function gimbaled optical sensor system 100 in which a jitter sensing mechanism according to various embodiments may be implemented. The system 100 may be mounted on an aircraft, for example, or other mobile platform. The system 100 includes passive sensors, for example, an infrared (IR) focal plane array 105 and a visible focal plane array 110, and active sensors, for example, a laser transmit/receive module 115. Laser beam steering mirrors 180 may be used to guide optical beams to and from the active sensors, such as the laser transmit/receive module 115. A dichroic beam splitter 120 is used to separate the optical paths for the passive sensors and the active sensors. In the illustrated example, the passive path includes a relayed imager 125, and additional dichroic beam splitters 130 are used to direct the optical beams to the various passive sensors. In the example illustrated in FIG. 1, components to the left of line 135 are gimbal-mounted; whereas components to the right of line 135 are off-gimbal and body-mounted on the aircraft. The gimbaled components of the system 100 may include afocal foreoptics 155 and pointing mirrors 160, 165. Optical beams pass via a window 170 from the pointing mirrors 160, 165 to object space, and vice versa. A beam-steering mirror 195 is used to steer the line of sight of the sensors, as discussed further below.

Figure 2:
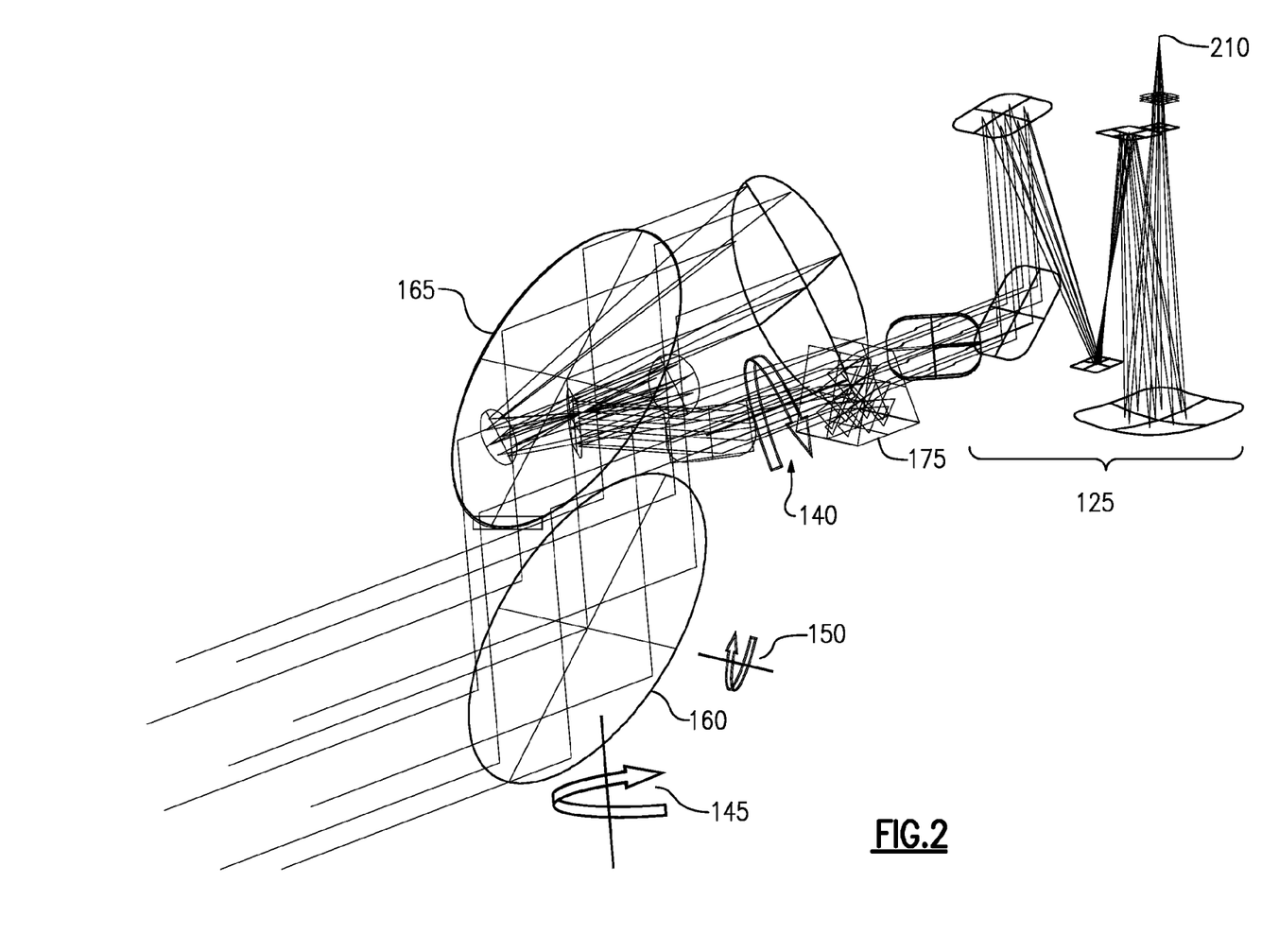
FIG. 2 is a corresponding ray trace of a passive sensor optical path through the system of FIG. 1 for the system in a forward step-stare mode of operation.

FIG. 2 illustrates a ray trace of the passive sensor optical path through the system of FIG. 1 operating in a forward step-stare mode (i.e., the line of sight of the system is along the roll axis, in the direction of travel of the aircraft). It is to be appreciated that the system 100 may also be operated in other modes, for example, in an elevation stare-track mode or in a side-looking stare-track mode. In FIG. 2, focal point 210 corresponds to the focal lane array of at least one passive sensor (e.g., IR focal plane array 105 or visible focal plane array 110).

According to one embodiment, the opto-mechanical assembly of the system 100 includes a three-axis gimbal, having a roll axis (represented by arrow 140) aligned with the direction of travel of the aircraft, an azimuth axis 145, and an elevation axis 150. The roll and azimuth axes may introduce image rotation to the images constructed from optical beams received by the optical sensor system 100. Accordingly, the system 100 may include a derotation device 175, for example, a derotation prism, to compensate for this image rotation. In one example, the opto-mechanical assembly may be configured to sweep the fields of view of the sensors over a wide range of azimuth angles, for example, approximately −80° to 80°, and over a smaller range of elevation angles, for example, approximately ±10° or ±20°. In addition, movement on the roll axis may sweep fields of view of the sensors over a wide range of roll angles. Thus, by moving the gimbal in roll and azimuth, and to a smaller degree elevation, the system 100 can point the fields of view of the active and passive sensors over a very large field of regard, as discussed above. In contrast, as also discussed above, the fields of view of the sensors may be very small. For example, the visual focal plane array 110 may have a field of view of approximately 2.5 degrees, with an individual pixel subtending 23 microradians (μrad) and the infrared focal plane array 105 may have a field of view of approximately 2.5 degrees, with an individual pixel subtending 45 μrad. In another example, the visual focal plane array 110 may have a field of view of approximately 2.5 degrees and an individual pixel subtending 12 μrad and the infrared focal plane array 105 may have a field of view of approximately 2.5 degrees and an individual pixel subtending 30 μrad. Thus, very precise jitter control, for example, approximately 8 μrad, 4-5 μrad or 2-4 μrad, may be desirable.

In one embodiment, a double-pass jitter sensing technique is used for line-of-sight jitter sensing in the optical sensor system 100. Referring to FIG. 1, since the jitter sensing beam 320 travels through the optical components of the system 100 along the sensor line of sight, jitter on the jitter sensing beam is the same as jitter on the line of sight. Accordingly, error signals generated from the jitter sensing measurements taken using the jitter sensing beam may be used to apply corrections to the beam-steering mirror 195, as discussed above. The use of a double-pass jitter sensing technique may allow both the source of jitter sensing beam and the jitter sensing detector to be located off-gimbal and body-mounted on the aircraft (i.e., to the right of line 135 in FIG. 1). Additionally, the use of a double-pass jitter sensing technique may allow the return beam to be interfered with a coherent phase reference and form an interferometer, such that absolute changes in optical path length can be additionally sensed. The sensing of such changes in optical path length may be desirable for certain advanced coherent detection Lidar subsystems.

Figure 3:
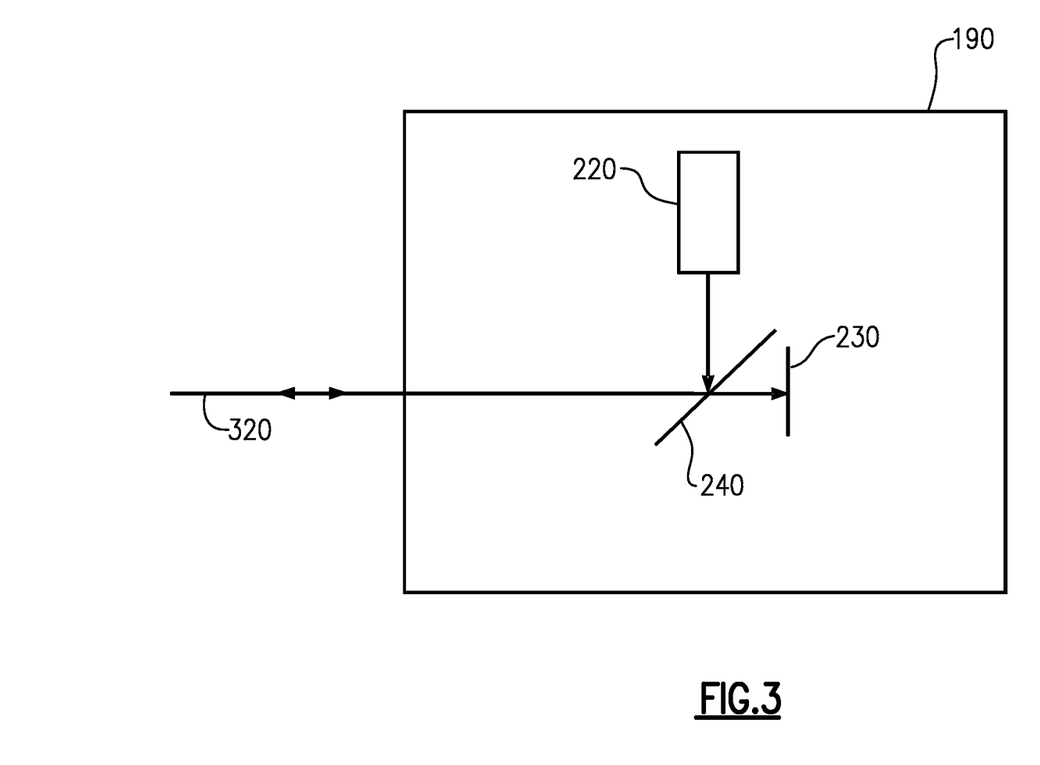
FIG. 3 is a block diagram of one example of a jitter sensing module that may be used in the optical sensor system of FIG. 1, according to aspects of the invention.

The optical system 100 includes a jitter sensing module 190. Referring to FIG. 3, in one embodiment, the jitter sensing beam source 220 and jitter sensing detector 230 for jitter control can both be located within module 190. The jitter sensing beam 320 from the beam source 220 comes out of module 190, travels forward through all optical elements, reflects off a faceted retro-mirror 410, as discussed further below, and returns to module 190 by the same path to the sensing detector 230. A beam splitter 240 may be used to separate the forward and return optical paths of the jitter sensing beam 320 within the module 190.

Figure 4:
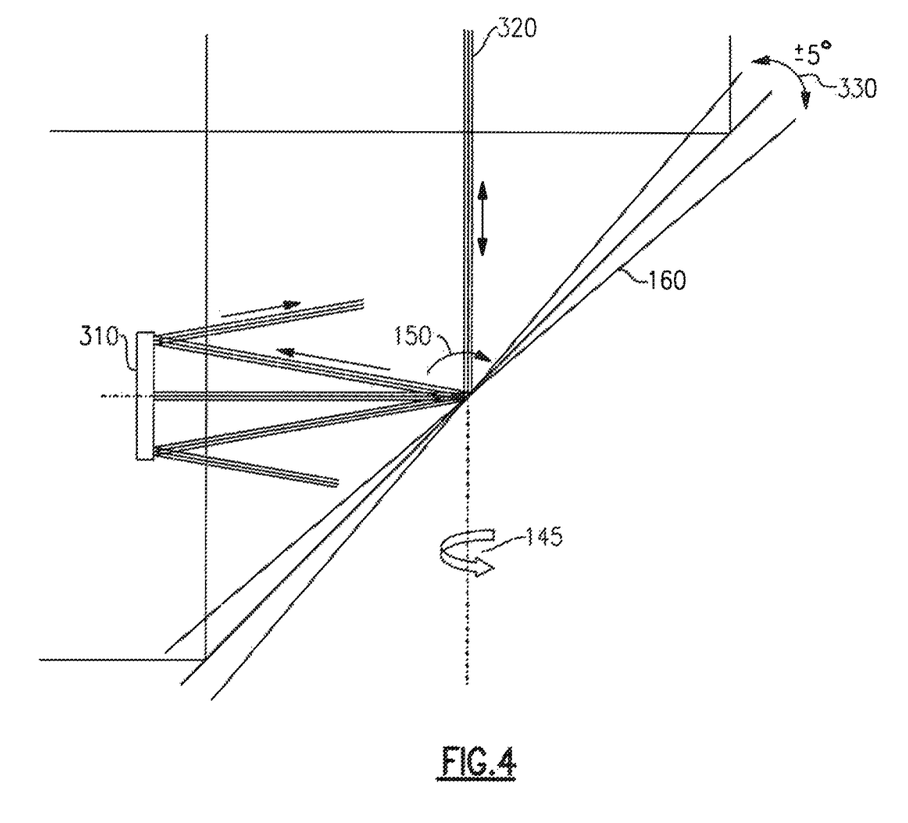
FIG. 4 is a diagram illustrating movement of a jitter sensing optical beam with angular travel of a 2:1 gain elevation mirror according to aspects of the invention.

According to one embodiment, the elevation axis is the inner-most axis of the three-axis gimbal. A mirror 410 located out of plane with the elevation mirror 160 may be used to return the jitter sensing beam 320 to the jitter sensing detector 230 within module 190 to provide jitter sensing measurements. In one embodiment, the elevation axis 150 steers the sensor line of sight at twice the rate of movement of the elevation mirror 160, whereas the azimuth 145 and roll 140 axes steer the sensor line of sight at the same rate as the mirror or gimbal. As a result, referring to FIG. 4, if a flat mirror 310 is used to reflect the jitter sensing beam 320, angular movement of the elevation mirror 160 may quickly cause the retro-reflected beam to fall outside of the field of view of the jitter sensing detector 230 within module 190, as illustrated in FIG. 4. For example, ±5° angular travel 330 of the elevation mirror 160 results in ±10° travel of the jitter sensing beam 320, which may result in the retro-reflected beam not being returned to the jitter sensing detector 230 within module 190.

Figure 5:
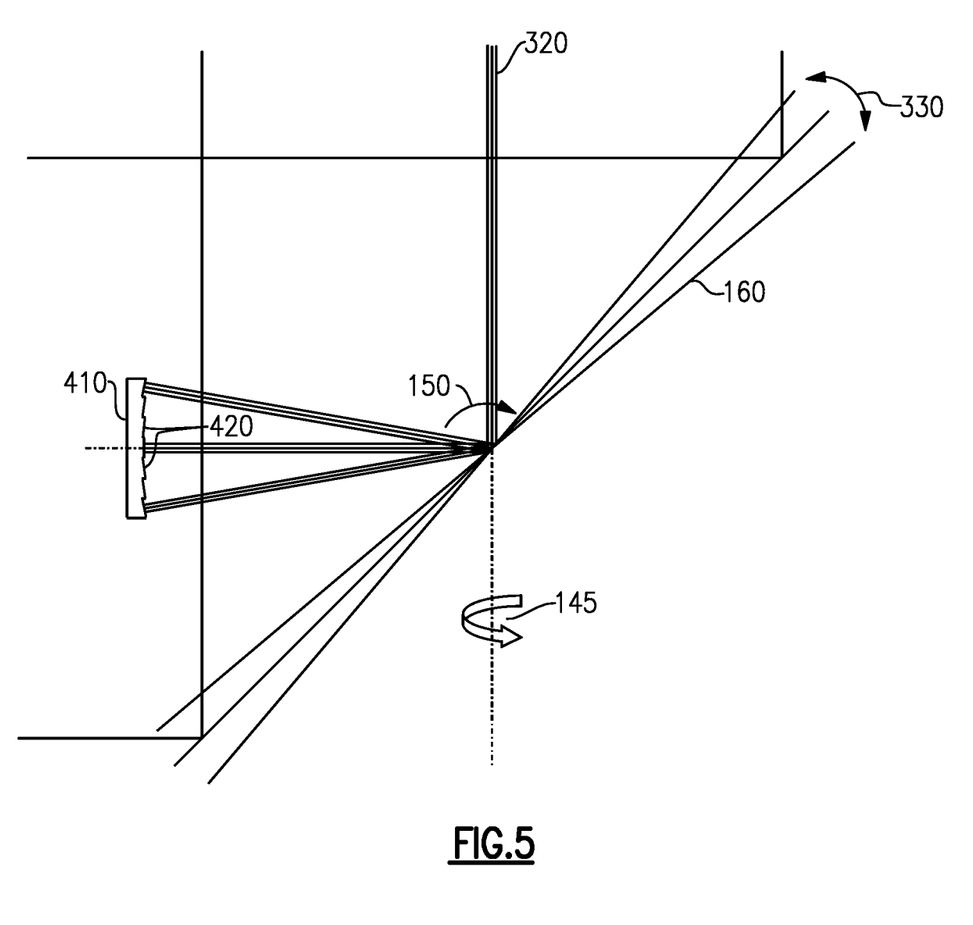
FIG. 5 is a diagram illustrating use of an out-of-plane faceted retro-mirror for jitter sensing beam sensing according to aspects of the invention.

Therefore, referring to FIG. 5, in one embodiment, the flat mirror 310 is replaced with a faceted retro-mirror 410. In one example, the faceted retro-mirror 410 is located on the object space side of the inner-most gimbal axis. As discussed above, in one example, the inner-most gimbal axis is the elevation axis 150. The elevation mirror 160 may be a 2:1 gain flex-pivoted flat fold mirror. The faceted retro-mirror 410 includes a reflective face that is formed with a plurality of facets 420, each angled slightly with respect to adjacent facets. In one embodiment, the faceted retro-mirror 410 is rigidly mounted on the azimuth axis 145 of the gimbal such that the mirror moves with movement of the azimuth axis but does not move in elevation as the elevation mirror 160 is actuated. Accordingly, angular movement 330 of the elevation mirror 160 causes the jitter sensing beam to translate from facet to facet of the faceted retro-mirror 410. The tilt angle of each facet 420 may differ from that of its nearest neighbor facet by a specified number of degrees, for example, one degree(1°). As a result, every 0.5° of angular motion of the elevation mirror 160, causing a 1° line of sight elevation movement, will cause the jitter sensing beam to return the center of the field of view of the jitter sensing detector 230, as discussed further below. The faceted retro-mirror 410 may be designed with facets that are angled with respect to one another by an amount other than 1°. For example, the difference between the angles of the facets may be selected based on a desired size of the mirror 410, number of facets 420, and/or expected range of angular motion of the elevation mirror 160. The faceted retro-mirror 410 removes the line of sight bias from the jitter sensing beam and allows the beam to stay within the field of view of the jitter sensing detector 230 for jitter sensing. This mechanism allows for accurate line of sight jitter sensing because the jitter sensing beam double-passes and samples all optical surfaces in the line of sight optical path. Conventional jitter-sensing mechanisms may exclude one or more optical surfaces and hence compromise the accuracy of the monitoring process.

Figure 6:
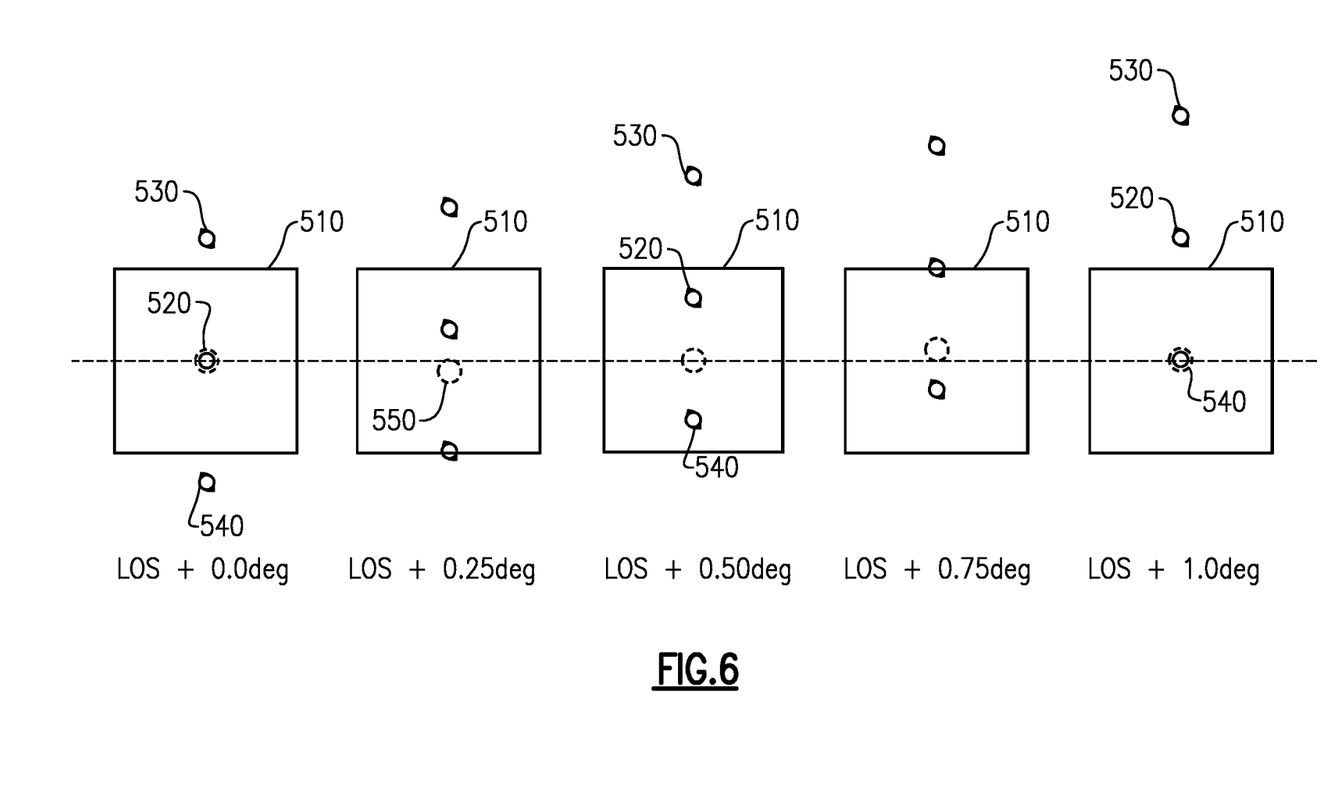
FIG. 6 is a diagram illustrating one example of detection of returned jitter sensing beams from adjacent facets of faceted retro-mirror according to aspects of the invention.

Referring to FIG. 6, there is illustrated a diagram showing movement of the reflected jitter sensing beam on the jitter sensing detector 230 within module 190 corresponding to angular movement of the elevation mirror 160. In one embodiment, the jitter sensing detector 230 includes a photodetector 510, such as a photo-potentiometer ("photopot") or position sensitive detector (PSD) that detects the incident jitter sensing beam. In the example illustrated in FIGS. 5 and 6, the faceted retro-mirror 410 includes a plurality of facets 420 with a central flat facet and the facets above and below the central facet tilted by 1° degree relative to one another. When the elevation mirror 160 is centered, the jitter sensing beam is reflected by the center facet 420 of the faceted retro-mirror, and the reflected beam (referred to as the 0° facet return 520) is centered on the photodetector 510, as illustrated in the first (left-most) panel of FIG. 6. The +1° facet return 530 (i.e., beam reflected by the facet immediately below the central facet) and −1° facet return 540 (i.e., beam reflected by the facet immediately above the central facet) both are returned outside the field of view of the photodetector 510. Thus, for the neutral position of the elevation mirror 160, the photodetector 510 detects the jitter sensing beam based on the 0° facet return 520.

FIG. 6 illustrates the shifting of the 0°, +1° and −1° facet returns 520, 530 and 540, respectively, on the photodetector 510 as the line of sight of the system 100 (and therefore the jitter sensing beam 320) is moved by actuation of the elevation mirror 160. With each 0.25 degree shift, one or more facet returns remain within the field of view of the jitter sensing detector 230 and are detected by the photodetector 510, as shown in FIG. 6. A one degree movement in the line of sight (corresponding to a 0.5 degree movement of the elevation mirror 160) causes the jitter sensing beam to translate completely to the adjacent facet and returns the beam to the center of the photodetector 510. This is illustrated in the last (right-most) panel of FIG. 6, where the −1° facet return 540 is illustrated centered on the photodetector 510. The faceted retro-mirror 410 (moving on the azimuth axis 145) periodically returns the jitter sensing beam to the center of the jitter sensing detector 230 field of view. Thus, the faceted retro-mirror 410 removes the absolute elevation angle from the beam, modulo 1° (or another amount, based on the angle of separation between adjacent facets), yet retains the line of sight jitter information in both the azimuth and elevation dimensions unperturbed for accurate jitter sensing and corrections.

In one embodiment, the diameter of the jitter sensing beam may be larger than the individual mirror facets 420. Therefore, multiple jitter sensing beam returns may be generated by adjacent mirror facets 420, as discussed above and illustrated in FIG. 6. However, since each of the facet returns 520, 530, 540 contains the same line of sight error information, having double-passed and touched all optical surfaces, the presence of two or more beams in the jitter sensing detector 230 field of view may not be problematic. In one example, the photodetector 510 is a pixilated imaging array sensitive to the wavelength of the jitter sensing beam. Using this type of sensing detector, the presence of two or more beams is easily distinguished and the desired jitter measurement signal is easily determined.

In another example, the photodetector 510 is a single position centroid sensing photodetector, also known as a photopot, that is sensitive to the wavelength of the jitter sensing beam. These types of detectors are configured to determine the centroid of incident light (from one or more beams) Dotted circle 250 represents the centroid of the returned jitter sensing beam 320. As can be seen with reference to FIG. 6, in some circumstances, multiple facet returns may be incident on the photodetector 510 at the same time, which may result in some sensing ambiguity. Although the position centroid sensing photodetectors may be configured to handle such ambiguities, the ambiguities may cause a loss of resolution in the jitter measurements, and therefore may be undesirable in embodiments where the jitter sensing and compensation requirement is only a few microradians. As discussed above, this ambiguity may be negated by the use of a pixilated imaging array for the photodetector 510.

Figure 7:
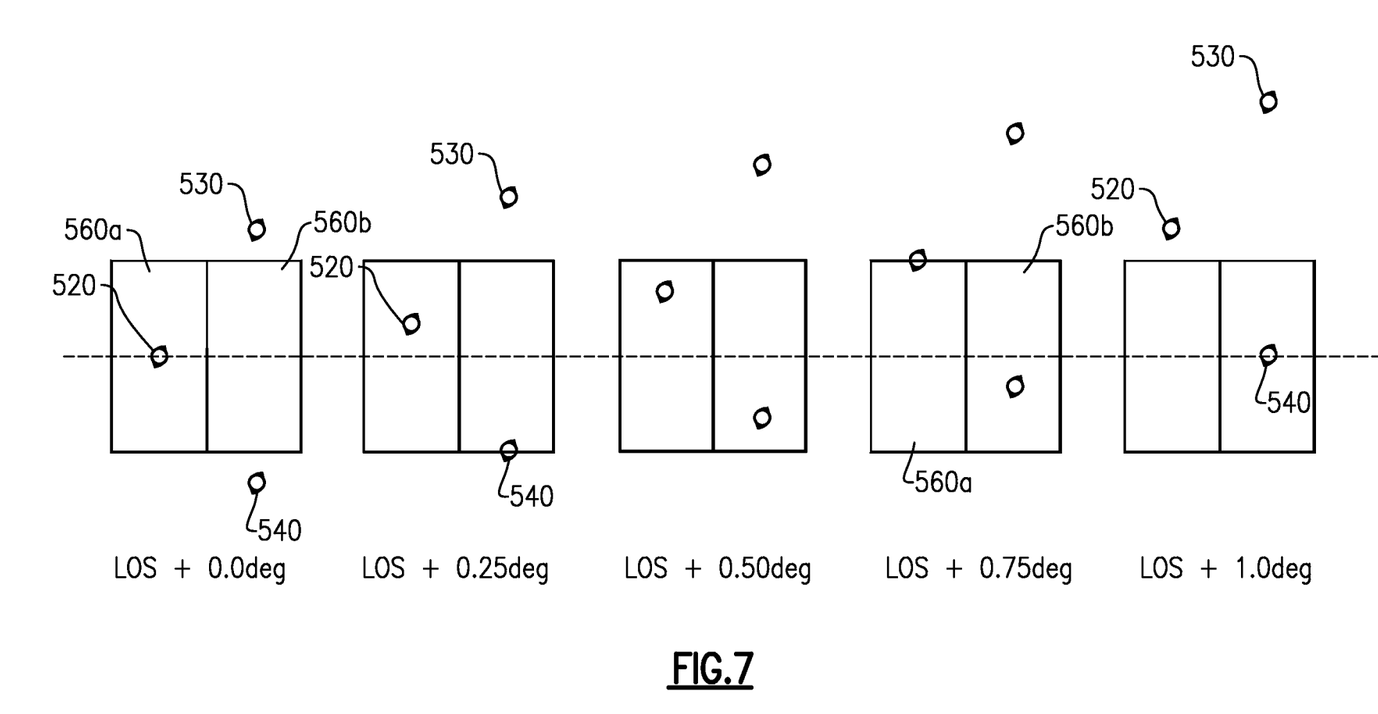
FIG. 7 is a diagram illustrating another example of detection of returned jitter sensing beams from adjacent facets of faceted retro-mirror according to aspects of the invention.

According to another embodiment, the faceted retro-mirror 410 is configured with each facet 420 also having a fixed azimuth angle bias. In addition, in one embodiment, the jitter sensing detector 230 includes at least two photodetectors arranged side-by-side, as illustrated for example in FIG. 7. In one example, the facets have alternating + and − azimuth tilts to separate the facet returns 520, 530 or 540. The fixed azimuth angles biases or tilts of the facets may be selected such that only a single facet return 520, 530 or 540 falls on either one of the pair of photodetectors 560*a*, 560*b* at any given time, as shown in FIG. 7. Potential ambiguities in the jitter sensing beam measurements are thus avoided. In some examples, the fixed azimuth angle biases of the facets 420 may be substantially smaller than the facet angles. For example, as discussed above, the facet angles may be approximately 1° from one facet to an adjacent facet, whereas the azimuth angle biases may be only a fraction of a degree, for example, about one half of a degree. In certain examples, the azimuth angle biases need only be sufficient to separate the facet returns such that adjacent facet returns fall on different photodetectors (e.g., 560*a* or 560*b*) at any given time.

Figure 8A:
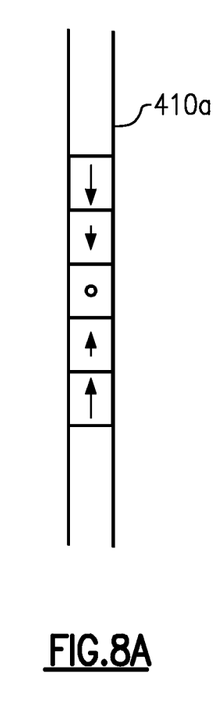
FIG. 8A is a schematic front view of one example of a faceted retro-mirror without alternating azimuth tilts, according to aspects of the invention.
Figure 8B:
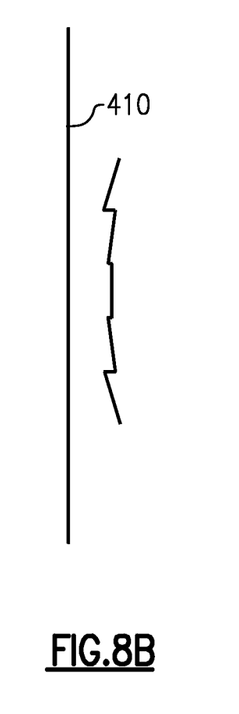
FIG. 8B is a schematic side view of one example of a faceted retro-mirror according to aspects of the invention.
Figure 8C:
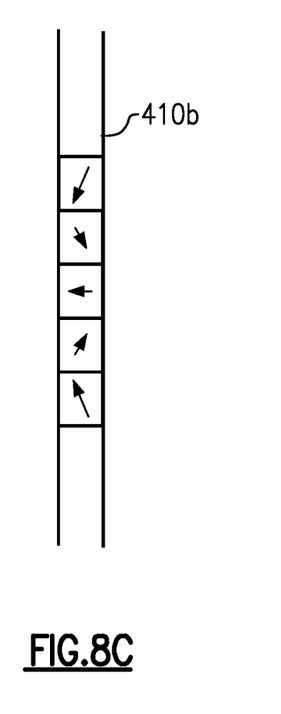
FIG. 8C is a schematic front view of one example of a faceted retro-mirror including alternating azimuth tilts, according to aspects of the invention.

FIG. 8A is a schematic front view of one example of a faceted retro-mirror 410*a* without alternating azimuth tilts. In FIG. 8A, the arrows represent facet normals. FIG. 8B is a schematic side view of an example of the faceted retro-mirror 410, and FIG. 8C is a schematic front view of one example of a faceted retro-mirror 410*b* having alternating azimuth tilts, as discussed above. In FIG. 8C, the arrows represent facet normals.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A gimbaled optical sensor system comprising:
   a multi-axis gimbal;
   a jitter sensing beam source configured to generate a jitter sensing beam that travels along a line of sight of the gimbaled optical sensor system;
   a jitter sensing beam detector;
   a 2:1 gain flat mirror mounted on an inner-most gimbal axis and configured to reflect the jitter sensing beam; and
   a faceted retro-mirror rigidly mounted on a second gimbal axis, positioned out of plane with the 2:1 gain flat mirror, and optically coupled to the 2:1 gain flat mirror, the faceted retro-mirror including a plurality of facets each tilted with respect to adjacent facets by an angular tilt, the faceted retro-mirror configured to reflect the jitter sensing beam to a field of view of the jitter sensing detector over a range of angular movement of the 2:1 gain flat mirror.

2. The gimbaled optical sensor system of claim 1, wherein the angular tilt of the adjacent facets is approximately one degree in elevation.

3. The gimbaled optical sensor system of claim 2, wherein the jitter sensing beam detector includes a position centroid sensing photodetector.

4. The gimbaled optical sensor system of claim 2, wherein the jitter sensing beam detector includes a pixilated imaging array.

5. The gimbaled optical sensor system of claim 1, wherein the inner-most gimbal axis is an elevation axis, and the second gimbal axis is an azimuth axis.

6. The gimbaled optical sensor system of claim 1, wherein the range of angular movement of the 2:1 gain flat mirror is approximately ±5 degrees.

7. The gimbaled optical sensor system of claim 1, wherein the range of angular movement of the 2:1 gain flat mirror is approximately ±10 degrees.

8. The gimbaled optical sensor system of claim 1, wherein each facet of the plurality of facets further includes an alternating azimuth tilt.

9. The gimbaled optical sensor system of claim 8, wherein the jitter sensing beam detector includes two photodetectors positioned side-by-side, and wherein the alternating azimuth tilt of each facet is selected such that each facet reflects the jitter sensing beam to only one of the two photodetectors.

10. A multi-function gimbaled optical sensor system comprising:
   a jitter sensing beam source configured to generate a jitter sensing beam;
   a jitter sensing detector; and
   an opto-mechanical assembly including a 2:1 gain flat mirror mounted on an elevation axis of the opto-mechanical assembly, and a faceted retro-mirror mounted on an azimuth axis of the opto-mechanical assembly and optically coupled to the 2:1 gain flat mirror, the opto-mechanical assembly being configured to actuate the 2:1 gain flat mirror over a range of angular movement;
   wherein the faceted retro-mirror includes a plurality of facets each tilted with respect to adjacent facets by an angular tilt, the faceted retro-mirror being configured to reflect the jitter sensing beam to a field of view of the jitter sensing detector over the range of angular movement of the 2:1 gain flat mirror.

11. The multi-function gimbaled optical sensor system of claim 10, wherein the angular tilt of the adjacent facets is approximately one degree in elevation.

12. The multi-function gimbaled optical sensor system of claim 11, wherein the jitter sensing detector includes one of a position centroid sensing photodetector and a pixilated imaging array.

13. The multi-function gimbaled optical sensor system of claim 10, wherein the range of angular movement of the 2:1 gain flat mirror is approximately ±5 degrees.

14. The multi-function gimbaled optical sensor system of claim 10, wherein the range of angular movement of the 2:1 gain flat mirror is approximately ±10 degrees.

15. The multi-function gimbaled optical sensor system of claim 10, wherein each facet of the plurality of facets further includes an alternating azimuth tilt.

16. The multi-function gimbaled optical sensor system of claim 15, wherein the jitter sensing beam detector includes two photodetectors positioned side-by-side, and wherein the alternating azimuth tilt of each facet is selected such that each facet reflects the jitter sensing beam to only one of the two photodetectors.

17. A method of line of sight jitter sensing in a gimbaled optical sensor system, the method comprising:
   generating a jitter sensing beam;
   directing the jitter sensing beam along a line of sight of the optical sensor system;
   reflecting the jitter sensing beam from a 2:1 gain flat mirror to a faceted retro-mirror disposed out of plane with the 2:1 gain flat mirror;
   actuating the 2:1 gain flat mirror over a range of angular motion; and
   returning the jitter sensing beam from at least one facet of the faceted retro-mirror via the 2:1 gain flat mirror to a jitter sensing detector over the range of angular motion of the 2:1 gain flat mirror.

18. The method of claim 17, wherein actuating the 2:1 gain flat mirror includes actuating the 2:1 gain flat mirror over at least ±5 degrees of angular motion.

19. The method of claim 17, wherein actuating the 2:1 gain flat mirror includes actuating the 2:1 gain flat mirror over at least ±10 degrees of angular motion.

* * * * *